United States Patent
Rehm et al.

(10) Patent No.: US 8,149,338 B2
(45) Date of Patent: Apr. 3, 2012

(54) METHOD AND APPARATUS FOR COLOR DECISION METADATA GENERATION

(75) Inventors: Eric Carl Rehm, Bainbridge Island, WA (US); Joshua Pines, San Francisco, CA (US); Pierre Ollivier, Culver City, CA (US); Jan Van Rooy, S'Hertogenbosch (NL); David J. Bancroft, Reading (GB)

(73) Assignee: Thomson Licensing, Boulogne-Billancourt (FR)

( * ) Notice: Subject to any disclaimer, the term of this patent is extended or adjusted under 35 U.S.C. 154(b) by 1383 days.

(21) Appl. No.: 11/663,246

(22) PCT Filed: Sep. 29, 2005

(86) PCT No.: PCT/US2005/034891
§ 371 (c)(1),
(2), (4) Date: Mar. 19, 2007

(87) PCT Pub. No.: WO2006/039357
PCT Pub. Date: Apr. 13, 2006

(65) Prior Publication Data
US 2007/0268411 A1    Nov. 22, 2007

Related U.S. Application Data

(60) Provisional application No. 60/614,110, filed on Sep. 29, 2004.

(51) Int. Cl.
*H04N 5/21*    (2006.01)
*H04N 5/222*    (2006.01)

(52) U.S. Cl. .................... 348/722; 348/624; 348/630

(58) Field of Classification Search .................. 348/722, 348/630, 624, 675, 679, 23.1, 242, 253, 256; 382/167; 345/589, 591, 597, 600; 358/518–522
See application file for complete search history.

(56) References Cited

U.S. PATENT DOCUMENTS

| | | | |
|---|---|---|---|
| 3,852,808 A | | 12/1974 | Sadashige |
| 4,962,418 A | | 10/1990 | Kamaga |
| 5,181,098 A | | 1/1993 | Guerin et al. |
| 5,874,955 A | * | 2/1999 | Rogowitz et al. .............. 345/589 |

(Continued)

FOREIGN PATENT DOCUMENTS

EP    1083567    3/2001

(Continued)

OTHER PUBLICATIONS

"Advanced Authoring Format (AAF) Object Specification v1.0.1" AAF Association Specification, Feb. 3, 2004 XP002369107 p. 8-p. 9, p. 88-p. 90.

(Continued)

*Primary Examiner* — Victor Kostak
(74) *Attorney, Agent, or Firm* — Robert D. Shedd; Vincent E. Duffy; Joel M. Fogelson

(57) ABSTRACT

A method presents metadata that is used for determining the color correction processes to be performed on image data representing a sequence of moving images. Instructions in the metadata controls how many color corrections are to be performed and when such operations occur. The image data is then subjected to the specified color correction operations that are performed at specified times and in a determined order. The image data is then rendered as a series of images by a rendering device. Optionally, different regions of the image data may be subjected to different color correction operations.

8 Claims, 3 Drawing Sheets

U.S. PATENT DOCUMENTS

| | | | |
|---|---|---|---|
| 6,536,904 B2 | 3/2003 | Kunzman | |
| 6,844,883 B2 | 1/2005 | Bakhmutsky | |
| 7,545,541 B2 * | 6/2009 | Dalrymple et al. | 358/3.28 |
| 2003/0202121 A1 | 10/2003 | Huh et al. | |
| 2003/0234796 A1 | 12/2003 | Bakhmutsky | |
| 2004/0086265 A1* | 5/2004 | Tojo et al. | 386/69 |
| 2005/0071888 A1 | 3/2005 | Girouard et al. | |
| 2006/0088105 A1* | 4/2006 | Shen et al. | 375/240.21 |
| 2006/0139462 A1* | 6/2006 | Fukasawa et al. | 348/231.3 |
| 2006/0165378 A1* | 7/2006 | Noda et al. | 386/95 |
| 2007/0092159 A1* | 4/2007 | Larkin et al. | 382/276 |

FOREIGN PATENT DOCUMENTS

| | | |
|---|---|---|
| JP | 1321794 | 5/1990 |
| WO | WO2004/002170 | 12/2003 |

OTHER PUBLICATIONS

Senge M. et al.: "High speed film scanning: resolution independent film-mastering" Broadcasting Convention. International (Conf. Publ. No. 428) Amsterdam, Netherlands Sep. 12-16, 1996, London, UK, IEEE, UK, Sep. 12, 1996, pp. 381-385, XP006510050 ISBN:0-85296-663- abstract 6 pp. 383,col. 1, line 7-line 18.

"MPEG-7 Overview (Version 8)" International Organization for Standardization—Organisation Internationale DE Normalisation, Jul. 2002, p. 84 XP001100622.

"DIG35 Specification : Metdata for Digital Images—Version 1.1" Digital Imaging Group, Jun. 18, 2001, XP002224803 Annex D.

Pete Comandini Signal Processing in the Image Transform System vol. 86, Aug. 1997 pp. 547-549.

* cited by examiner

METHOD AND APPARATUS FOR COLOR DECISION METADATA GENERATION

CROSS-REFERENCE TO RELATED APPLICATIONS

This application claims the benefit of U.S. Provisional Application Ser. No. 60/614,110 filed Sep. 29, 2004.

This application claims the benefit, under 35 U.S.C. §365 of International Application PCT/US05/034891 filed Sep. 29, 2005 which was published in accordance with PCT Article 21(2) on Apr. 13, 2006 in English.

FIELD OF THE INVENTION

The present invention generally relates to the field of video processing, and more specifically the color correction of video segments.

BACKGROUND OF THE INVENTION

In the field of post production, as used in the movie or television industries, a person operating a video editor may manipulate the colors of video content in order to allow for a specific effect desired by a director for artistic purposes. For example, video content may be modified by brightening the colors of the video content to portray a "pastel" effect or a darkening of hues to portray a "gritty" color effect.

When the colors of video content are modified, it may be difficult for such changes to be retained from the editing device to the device that will be used to display device content such as a video monitor or a film projector. Additionally, if video content is subjected to multiple devices in an editing workflow, such devices may not have the means of communicating with each other to effectively indicate what changes were made to the colors of video content as different devices have different capabilities of handing color correction.

SUMMARY OF THE INVENTION

The problems stated above, as well as other related problems of the prior art, are solved by the present invention.

According to an aspect of the present invention, a method is related for transmitting and using metadata that relates the order of color correction operations to be performed on image data representing a sequence of images and the number of such operations to be performed on such image data.

These and other aspects, features and advantages of the present invention will become apparent from the following detailed description of preferred embodiments, which is to be read in connection with the accompanying drawings.

DETAILED DESCRIPTION OF THE INVENTION

Figure 1:
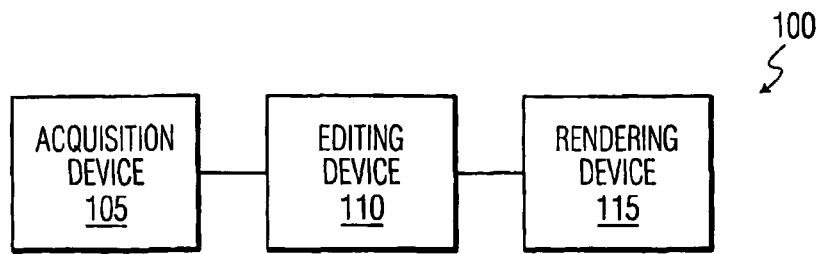
FIG. 1 is a diagram illustrating an exemplary embodiment of visual information acquisition and editing system.

An exemplary embodiment of the present invention is directed towards a video acquisition/editing workflow that is used to create, edit, and display video content. As shown in FIG. 1, system 100 is exemplary visual information acquisition/editing workflow that uses acquisition device 105 to acquire video content. Acquisition device 105 is a device such as a video camera, film camera, film digitizer, video capture device, or other type of device that is able to store visual information which may be later reproduced visually later in the form of a video segment. The term video segment means any temporal, spatial, or spatio-temporal segmentation of a sequence of images along a time line. The term visual information (or image data) is any type of information that is capable of representing an image. In the preferred embodiment of the present invention, visual information is information that is used for generate a sequence of images (moving images) as presented as a video sequence or as shown on film as a series of frames, for example.

Acquisition device 105 may store acquired visual information on a storage medium such as film, computer memory, flash cards, hard drives, Digital Versatile Disc (DVD), computer discs, digital storage device, archival storage tape, and the like. When such visual information is typically stored in a digital form, the acquisition device subjects the stored visual information to a transformation known as a color space that defines the color attributes of the stored video information. Different types of color spaces are known in the art such as defined by the International Commission on Illumination (CIE 1931L*a*b*), the International Telecommunication Union (ITU REC 601), Red Green Blue (RGB), and the like. These standards, among others in the art, define the color attributes of visual information when stored and such visual information is reproduced (in the form of video or film).

Visual information from acquisition device 105 is meant to be modified by editing device 110 which may take the form of a non-linear editor, computer, and the like. In a preferred embodiment of the present invention, editing device 110 is used for color management where visual information stored from acquisition device 105 is retrieved (scanned, read from a storage device, transmitted over a network connection, and the like) and is modifiable by software such as 2 k DA VINCI and DISCREET LUSTRE 4 k where color modification represent creative choices made by a person such as a colorist or a director.

Optionally, the color modifications represent an automatic operation where visual information is modified as to comport with the features of a device. For example, visual information that was stored by acquisition device 105 may have a color space that is different than used by editing device 110. Hence, the system is configured that the visual information is modified to the color space used for editing device 110 via a look up table, color transformation information, software translation and the like.

It should be noted that although the present invention acquisition/editing workflow system is discussed in regards to acquisition device 105 and editing device 110, it is to be appreciated that other devices may be used in the video editing workflow. For example, acquisition device 105 may represent a video camera used by a home user and editing device 110 may represent a home computer running Digital Video (DV) editing software, and other devices. Additionally, editing device 110 optionally represents a series of devices where each device is used for editing the visual information. For instance, one editing device 110 may be controlled by a director to make some initial color modification choices and a second editing device may be controlled by an operator to color correct such visual information before it is printed to film stock as a sequence of image frames by a rendering device 115.

Rendering device 115 is used for rendering the visual information as for display using a device such as a monitor, film projector, digital light processing (DLP), liquid crystal display, film printer, and the like, or rendering such information as film, CD-ROM, DVD, computer tape, flash card, and the like that is used to eventually render the visual information in a visual form. Preferably, the visual information will be composed as a sequence of moving images that are used to form things such as a video sequence (for videotape, DVD, streaming video, and the like) and images frames on film.

Applicants note that the principles of the invention, as to be explained below, also apply to consumer electronic equipment where a broadcaster or content producer (acting as a proxy for acquisition device 705) provides image data that represents a sequence of images. The broadcaster may specify for a specific type of device (such as for a particular type of display device) that one color correction technique be applied for one type of device (a plasma display device) and that a second color correction be applied for a second type of device (a Cathode Ray Tube display device). Other display devices may be specified, in accordance with the principles of the present invention. The principles of the present invention may also be used to calibrate editing equipment for consistent results when performing color correction operations.

As noted earlier in the application, device devices may utilize different color spaces or have had modifications performed on the colors of the visual information. The application presents a system of generating metadata that represents a framework where color modifications made may be transmitted between different devices and software used and/or provided by vendors. Preferably, this metadata is based off an XML schema associated color correction metadata with a sequence of images. The invention accommodates the premise where the color correction metadata may be temporally associated with a sequence of images where for between two time periods, two different sets color correction metadata are used.

Figure 2:
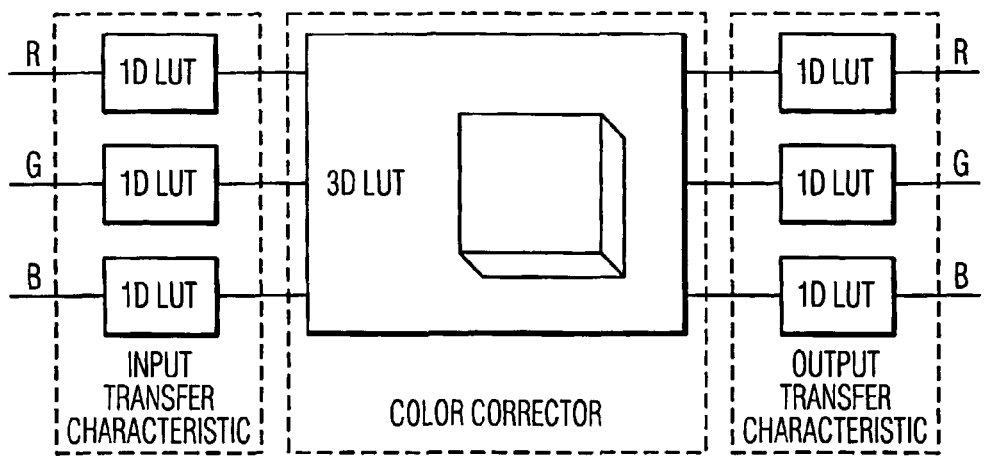
FIG. 2 is a diagram illustrating a color correction operation.

In addition, the invention accommodates the premise where different color correctors may be used for visual data. Different types of color correctors and color correction operations are known in the art such as using a series of three 1-D lookup tables with Red Green and Blue (RGB) output (see FIG. 2), a series of three 1-D tables using luma and chroma (YCrCb), 3-D lookup tables, pre-computed matrix transformations, lift gain gamma functional specifications, and the like. The application of the color correctors may then be ordered in different orders for different time period.

For example, for one time period for a sequence of images, the images are subject to first an RGB based color correction and then a color correction affected by a Lift Gain Gamma color correction operation. For a second time period, a second sequence of images is subjected to a 3-D lookup table and then an RGB based color correction operation. Other color correction processes may be used in accordance with the principles of the present invention.

TABLE 1 represents an exemplary embodiment of description tools used to perform color correction operations on a sequence of images. These operations may be reflected in the metadata that would be supplied with the sequence of images. Preferably, the described aspects of the color correction operators utilize terms defined as part of the Moving Picture Experts Group (MPEG-7) Visual Standard (ISO/IEC 15938-3:2002)

TABLE 1

| Set of description tools | Functionality |
| --- | --- |
| Color Correction | Describes the cascaded application of one, two or three color correctors. |
| Color Corrector | Describes the specification of a single color corrector. Sample types of color correctors include: Three 1-D Lookup Tables 3-D Lookup Table Precomputed Matrix Transformation Lift-Gain-Gamma functional specification. |
| Color Tools | Describes the components of color and their quantization. |
| Time Synchronization Tools | Describes the synchronization of media time and duration with film edge code and film length. |
| Structure description tools (from MPEG-7) | Describes the structure of the video with respect to the applied color corrections. The structural descriptions include spatial, temporal or spatio-temporal segments of the multimedia content. |

Figure 3:
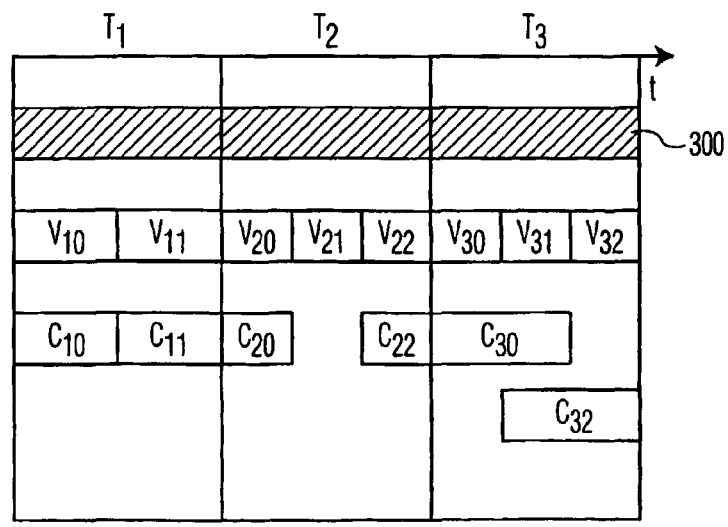
FIG. 3 is a schematic diagram illustrating the operation of various color correction operations being performed on different sequences of image data.

The application of color correctors can be applied anywhere within system 100, where multiple color correctors may take place for a specific device or at different times for a sequence of video images. FIG. 3 demonstrates an exemplary embodiment of when and where the different color correction processes may be performed. For a sequence of images presented as video sequence 300, the sequence is decomposed into a series of three time segments T1, T2, and T3. For T1, the video sequence is broken into two different video segments V10 and V11, where one color correction operation C10 is performed for V10 and a second color correction operation C11 is performed for V11.

Time T2 represents where there is a gap of time between the application of color correctors C20 and C22. As shown, video sequences V20 and V22 are subjected to C20 and C22, respectively. V21 is not subjected to a color correction operation. Time T3 represents the circumstance where a video sequence V30 is subjected to a color corrector C30, as a video sequence V32 is subject to a color corrector C32. It is also apparent that for a video sequence V31, both color correction operations C30 and C32 are applied to the video sequence, as to overlap during their time of application.

TABLE 2 represents an exemplary embodiment of an XML schema used to generate metadata indicating color correction metadata in the form of a color decision list.

TABLE 2

| XML Term | Components | Description |
| --- | --- | --- |
| ColorDecisionList | | Serves as the root element of the description. Colordecisionlist shall be used as the topmost element in a description. It is an element based on the |

TABLE 2-continued

| XML Term | Components | Description |
|---|---|---|
| | | MPEG-7 VideoSegment Descriptor Segment and embodies all of the temporal, spatial, and spatial-temporal decomposition provided by the MPEG-7 VideoSegment DS. |
| | MediaInformation | Identifying Metadata for the Sequence of Video Pictures for which this metadata is appended |
| | MediaType | Type of Media being color corrected. |
| | Visual Descriptor | Describes the visual features of images and video such as color, texture, shape and motion. Etc as in MPEG-7 |
| | Spatial Decomposition | Spatial Regions within an image or sequence of images (see MPEG-7) |
| | Temporal Decomposition | Temporal image segments (subsets of images) with a sequence of images (see MPEG-7) |
| | SpatioTemporal Decomposition | Moving regions with a sequence of images (see MPEG-7) |

TABLE 3 represents an exemplary embodiment of an XML schema used to generate metadata indicating the color correction processed used to color correct a segment of images.

TABLE 3

| XML Term | Components | Description |
|---|---|---|
| ColorCorrectionType | | A Color Correction Type defines the Color Correction Schemes used to color correct a sequence of images. Preferably, the number of color corrector operations performed is three, although more or less operations may be performed. |
| | ColorCorrector | A color corrector operator is an abstract element that can be substituted by the following color correctors listed below. |
| | ColorFunctionLGG | Color corrector operator that allows for a specification of lift, gain, and gamma. Up to three of these attributes may be modified. |
| | ColorLookUpX | Color corrector operator that allows for the specification of up to three 1D look up tables, one for each color component. (X = 1, 2, or 3). A 1-D lookup table is simple a 1 × N matrix, where N is the number of lookup elements. The number of lookup element (N) need not be related to the input or output quantization (e.g., the number of bits of R, G, or B of the input or output colors). |
| | ColorLookup3D | Color corrector operator allows for thee specification of three 1d look up table operations, preferable one for each color component depending on the color space selected. A 3-D lookup table is represented by a 4 dimensional matrix (L × M × N × 3). The first three dimensions (L × M × N) represent the number of lookup elements for each color component (e.g., R, G, B); the fourth dimension represents the 3 output color components. |
| | ColorLookUPPrecomputedMatrix | Color corrector operator allows for the specification of precomputed 3 × 3 transform of input RGB values via nine 1D Look Up Tables |

TABLE 4 represents an exemplary embodiment of an XML schema used to generate metadata indicating specifics of a particular color correction operation used to color correct a sequence of images.

TABLE 4

| XML Term | Components | Description |
| --- | --- | --- |
| ColorCorrectorBaseType | | For a specific color corrector, the generalized format of the metadata associated with the color corrector (which are in TABLE 3) |
| | InputColorSpace | The input color space of the color corrector. The types of available color spaces are preferably defined as in MPEG-7 for Colorspace datatype (RGB, YCbCr, HSV, HMMD, Linear Transform Matrix with reference to RGB, Monochrome) |
| | OutputColorSpace | The output color space of the color corrector. The types of available color spaces are preferably defined as in MPEG-7 for Colorspace datatype (RGB, YCbCr, HSV, HMMD, Linear Transform Matrix with reference to RGB, Monochrome) |
| | InputColorQuantization | The input color quantization of the color corrector. This variable specifies the color component to be quantized, allowing for the components to be quantized in an arbitrary order. The allowed color component combinations for each color space are R, G, B, Y, Cb, Cr, H, S, V, and the operators Max, Min, Diff, and Sum. This parameter is based off of the ColorQuantization descriptor from MPEG-7, but the value of this parameter is expanded up to 32 bits from a value of 12 bits. |
| | OutputColorQuantization | The output color quantization of the color corrector. This variable specifies the color component to be quantized, allowing for the components to be quantized in an arbitrary order. The allowed color component combinations for each color space are R, G, B, Y, Cb, Cr, H, S, V, and the operators Max, Min, Diff, and Sum. This parameter is based off of the ColorQuantization descriptor from MPEG-7, but the value of this parameter is expanded up to 32 bits from a value of 12 bits. |

A ColorLookup1D color correction operation, referred to above, preferably consists of three 1-D look up table for each color component. Typically, the quantization of the input color space equals the number of entries in the look up table. In this case, no interpolation is required. It is however possible for a 1-D color look up table to contain fewer entries than the input color space. For example, consider an RGB input color space with 6-bit color quantization and 16 entry look up table for each color component. The values of input values can be narrowed down to match the finite number of output values using interpolation techniques as known in the art.

A ColorLookup3D color corrector uses a 3-D color lookup table to perform transformations between color spaces. For example, a 3D lookup table with RGB input and output color spaces takes input RGB triples and maps it via interpolation, to an output R'G'B' triple, with a potentially unique output value for each RGB input triple. For an exact representation, each combination of color components in an input color space would be mapped to an output color component, using each color component as a lookup table dimension. For example, for a 10-bit RGB input and output color, one would create a 3-D cube with 1024×1024×1024 (or over a billion entries). Hence, to use this type of color correction, it is preferable to use some type of interpolation such as trilinear or tetrahedral interpolation, with some restrictions (see Kasson, Nin, Plouffe, Hafner, "Performing Color Space Conversions with Three Dimensional Interpolation", Journal of Electronic Imaging, July 1995, Vol. 4(4), for more information)

A ColorLookupPrecomputedMatrix color corrector uses a linear matrix transformation in the form of:

$$\begin{bmatrix} R^s \\ G' \\ B' \end{bmatrix} = \begin{bmatrix} a_{RR} & a_{RG} & a_{RB} \\ a_{GR} & a_{GG} & a_{GB} \\ a_{BR} & a_{BG} & a_{BB} \end{bmatrix} \begin{bmatrix} R \\ G \\ B \end{bmatrix}$$

The ColorLookupPrecomputedMatrix operation then computes a list of lookup values for each coefficient in a 3×3 transform matrix. For each output value (R', G', or B'), the processing consists in three look up operations (one for each of R, G, and B) followed by two additions. Nine 1D look up tables ($L'_{xx}$) are required in total:

$$\begin{cases} R' = L'_{RR}(R) + L'_{RG}(G) + L'_{RB}(B) \\ G' = L'_{GE}(R) + L'_{GG}(G) + L'_{GB}(B) \\ B' = L'_{BR}(R) + L'_{BG}(G) + L'_{BB}(B) \end{cases}$$

The ColorFunctionLGG color corrector is done using controls derived from analog video processing, namely, changing the lift (known as black level, pedestal, or set up), gain, and gamma of the input-output transfer characteristic for each color component. The color corrector provides the ability to specify a color correction function rather than enumerating lookup values. Formally, lift, gain, and gamma are assigned in view of a signal color component R.

Lift raises the y-intercept of the input-output transfer characteristic, where $$R' = R + L$$

where $L \in [-1, 1]$

Figure 4:
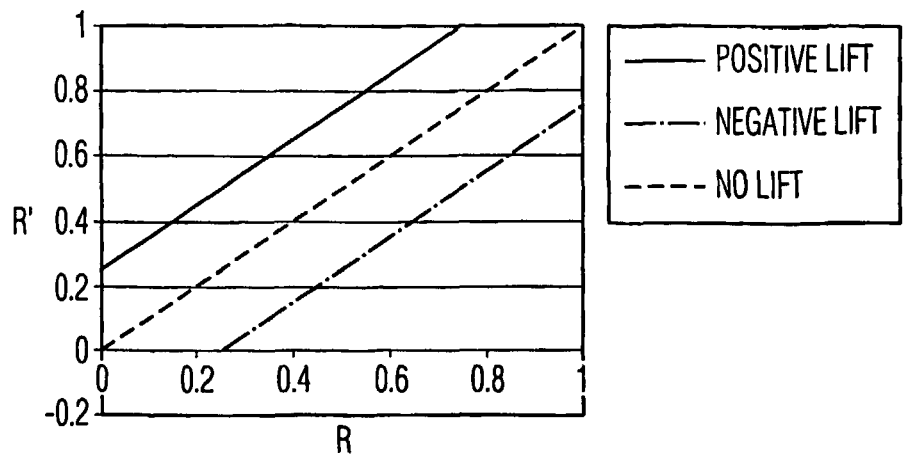
FIG. 4 is a sample lift curve used for a color correction operation.

The output value R' is limited by the normalized output interval [0,1], see FIG. 4 for a sample lift curve with the Lift=±0.25

For Gain:

Gain (G') scales the output value.

$$R' = GR \quad 0 \leq G < \infty$$

or equivalently $$G = \tan(\theta_G) \quad 0 \leq \theta_G \leq 90°$$

where $\begin{cases} G \in [0, \infty) \\ \theta_G \in [0, \frac{\pi}{2}] \end{cases}$ The output value R' is limited by the normalized output interval [0.1].

Figure 5:
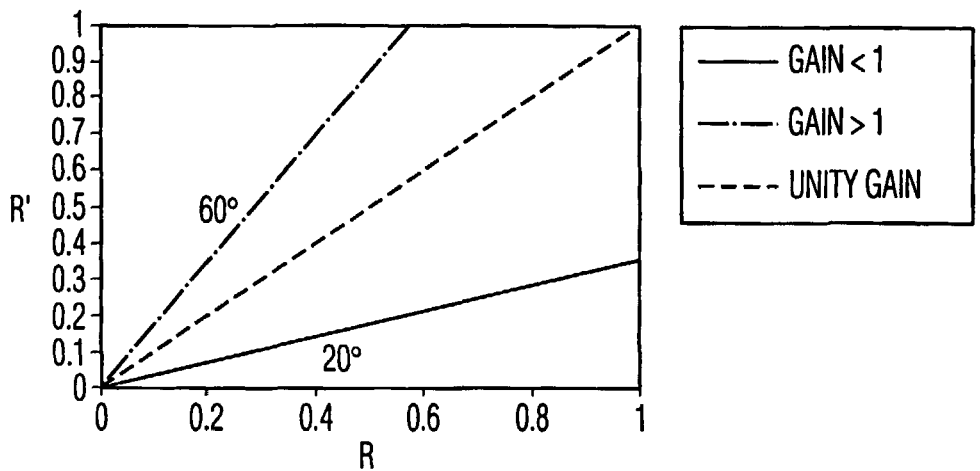
FIG. 5 is a sample gain curve used for a color correction operation.

See FIG. 5 or a sample gain curve, where Gain=0.364 (=20°), Gain=1.73 (60°)

For Gamma:

Gamma (γ) is a non-linear correction to a color component based on exponentation.

$$R' = R^\gamma$$

where $\gamma \in (0, 1]$

The output value R' is limited by the normalized output interval [0,1].

Figure 6:
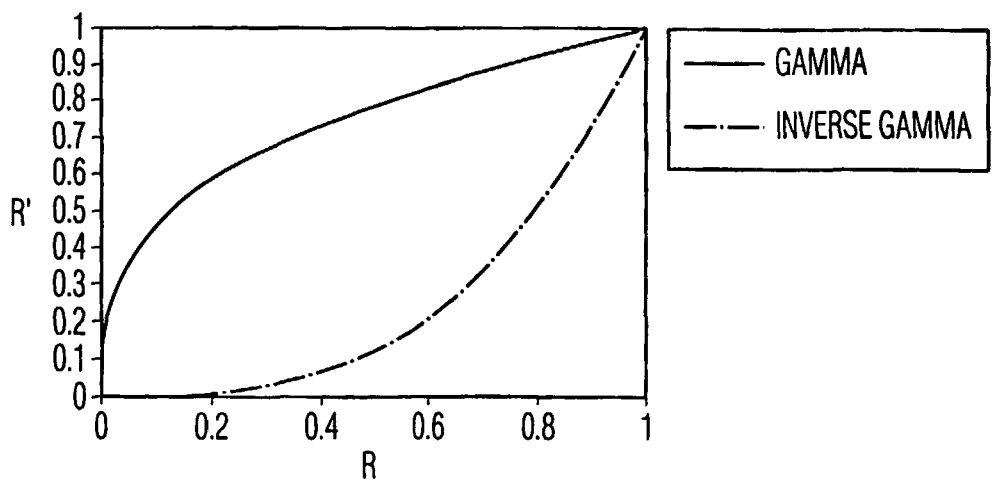
FIG. 6 is a sample gamma curve used for a color correction operation.

See FIG. 6 where y=0.333 and $y^{-1}$=3.0

The application of the functions listed above is in the order of Lift, Gain, and then Gamma. Or: $R' = [G(R+L)]^\gamma$ Preferably, for each sequence of images (video segment) should be described by a media time (starting time, instant, and duration) indicating the application (or non-application) of a color corrector. MPEG-7 MDS section 6.4 provides a number of different metadata sets to described media time. The time description is preferably based on a restricted set of lexical expressions of the International Standards Organization (ISO 8601) standard. Additionally, other representations of time for a sequence of images may be used such as Society of Motion Picture Television Engineers (SMPTE) time codes, using values in the format of a MediaTimePoint function, and using values in the format of a MediaTimeDuration function (both functions defined in MPEG-7), and the like.

It should be noted that although the principles of the present invention were described in regards to a sequence of video images, the invention supports the application of color correction over different regions of a sequence of images. Video segments decomposition tools (as described in MPEG-7 MDS ISO/IEC 15938-5 (11.4.9) describe how to decompose a series of video frames into respective space and time values. Alternatively, one may take an image from a sequence of images and decompose such an image into either rectangular or polygonal subregion (see MPEG-7 MDS ISO/IEC 15938-5 (11.4)). A color correction then may be applied to each subregion of each image.

If a specific region moves across frames, the principles of MPEG-7 MDS ISO/IEC 15938-5 (11.4) and MPEG-7 Visual 15938-3 (5.6, 9.4, and 10.3), may apply. By using the MPEG-7 tool moving region, a color correction may be applied to one or more moving regions whose outline is defined by a list of rectangles, ellipses, or an arbitrary polygon. The shape of the region can be rigid or non-rigid (such as polygon vertices that move relative to each other over with time). The motion of the region can be modeled by linear or quadratic time interpolation of the vertices of model parameters (such as two velocity parameters for rigid translation, four parameters for rotation and scaling, six parameters for affine transformations, and the like).

Figure 7:
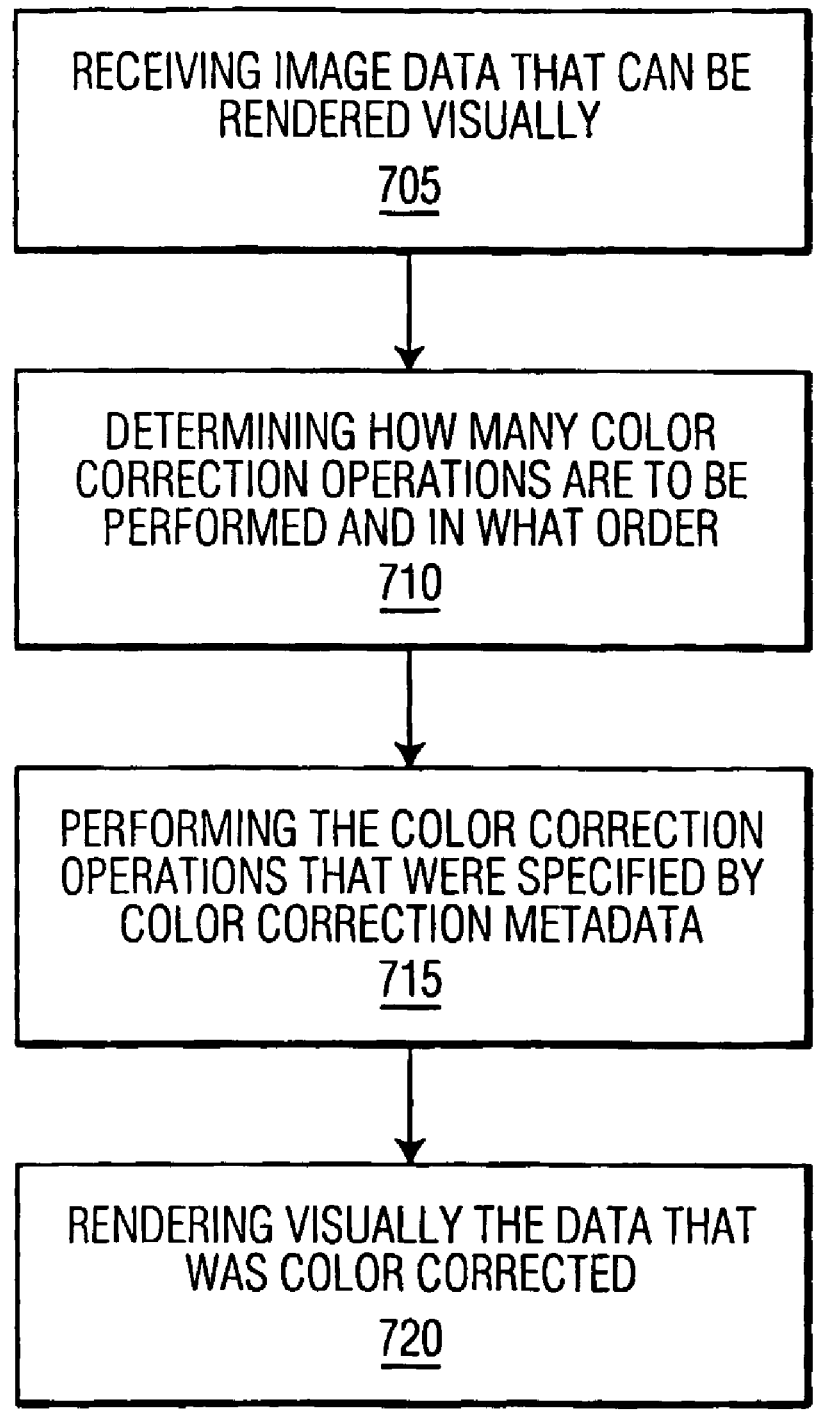
FIG. 7 is a diagram illustrating an embodiment of a method for applying a color correction operation to data that is capable of being rendered as a sequence of images.

FIG. 7 presents an exemplary embodiment of a method for performing color correction in view of the receipt of correction metadata, in accordance with the principles explained above. In step 705, a rendering device 115 receives data representing information that can be rendered visually as a sequence of moving images. In step 710, rendering device 115 determines if color correction metadata was received indicating whether the data representing information to be rendered visually should be color corrected. Within this step, a determination is made as to how many different color correction operations should be performed and in what order. Preferably, the number of different color operations to be performed is three.

Optionally in step 710, there is temporal information included with the metadata that indicates when specific color correction operation should take place, as explained above. Alternatively, there may be metadata that indicates that a certain region of a sequence of images (generated from the visual information) should be color corrected using a specific technique for a specific length of time. Other sequences of images or image regions may be subject to the same or different color correction operations, in accordance with the principles of the present invention.

Step 715 has rendering device 115 performing a color correction operation in accordance with received metadata. Several different color correction operations may be performed, if the color correction metadata indicates this to be the case. In addition, the metadata may control for how long and/or what parts of the visual information should be affected by a selected color correction operation. In step 720, the color corrected data is rendered as a series of images outputted to a display device, printed on a film printer, or any other type of device capable of rendering visual information (image data) in view of the color correction operations. It is noted that any device in system 100, including acquiring device 105 and editing device 110 may perform the steps indicated above. In addition, the aspect of generating metadata that indicates the number of color correction operations to be performed, the specific color operations to be performed, and the order of such operations may be performed by any device of system 100, by applying the inverse method steps as shown in FIG. 7.

It is also to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for generating as metadata for use in a color correction operation comprising the steps of:
   generating a first segment of metadata by a processor that describes a number of color correction operations to be preformed by a color correction machine;
   generating a second segment of metadata by said processor that specifies a color correction operation to be performed by said color correction machine; and
   generating a third segment of metadata by a processor that specifies temporal information indicating when to have said color correction machine perform said color correction operation on image data representing a sequence of moving images.

2. The method of claim 1 further comprising the additional step of:
   generating a fourth segment of metadata that specifies additional temporal information that is used by said color correction machine to perform a second color correction operation on an additional sequence of images.

3. The method of claim 2, the application of said color correction operation and said second color operation overlap when applied to said sequence and additional sequence of images.

4. The method for generating as metadata for use in a color correction operation comprising the step of:
   generating by a processor a first segment of metadata that describes a number of color correction operations to be preformed by a color correction machine;
   generating by said processor a second segment of metadata that specifies a color correction operation to be performed by said color correction machine; and
   generating by said processor a third segment of metadata for indicating a region of a image in which to perform said color correction operation by said color correction machine.

5. The method of claim 4, wherein said metadata indicates that said color correction operation is applied to the same region of two images selected from image data representing a sequence of images.

6. The method of claim 1, wherein said color correction operation is selected from at least one of a one dimensional color transformation, a three dimension color transformation, a predetermined matrix, and a lift, gain, and gamma function.

7. A method of performing a color correction operation comprising the steps of:
   determining with a processor of a color correction machine a number of color correction operations to be performed in response to received metadata; and
   performing with the processor of said color correction machine the color correction operations determined in said previous step on image data and said color correction operations are performed on a specified region of an image selected from image data used for rendering a sequence of images.

8. The method of claim 7, wherein said color correction operation is selected from at least one of a one dimensional color transformation, a three dimension color transformation, a predetermined matrix, and a lift, gain, and gamma function.

* * * * *

UNITED STATES PATENT AND TRADEMARK OFFICE
CERTIFICATE OF CORRECTION

PATENT NO.        : 8,149,338 B2
APPLICATION NO.   : 11/663246
DATED             : April 3, 2012
INVENTOR(S)       : Eric Carl Rehm et al.

It is certified that error appears in the above-identified patent and that said Letters Patent is hereby corrected as shown below:

In the Claims:

Column 12, Line 3, in claim 1 change "preformed" to "performed".

Column 12, Line 26, in claim 4 change "preformed" to "performed".

Signed and Sealed this
Fourth Day of September, 2012

David J. Kappos
*Director of the United States Patent and Trademark Office*